United States Patent [19]

Aliberto et al.

[11] Patent Number: 4,517,339
[45] Date of Patent: May 14, 1985

[54] BLEND OF IMPACT MODIFIER, VINYL CHLORIDE POLYMER, AND GLASSY AMORPHOUS POLYMER

[75] Inventors: Anthony C. Aliberto, Briarcliff Manor; Joseph Silberberg, Brooklyn, both of N.Y.

[73] Assignee: General Electric Company, Schenectady, N.Y.

[21] Appl. No.: 520,104

[22] Filed: Aug. 4, 1983

Related U.S. Application Data

[63] Continuation-in-part of Ser. No. 382,538, May 27, 1982, abandoned.

[51] Int. Cl.³ .................. C08L 51/00; C08L 33/08; C08L 33/10; C08L 27/06
[52] U.S. Cl. .................. 525/85; 525/71; 525/78; 525/81; 525/82
[58] Field of Search .................. 525/82, 85

[56] References Cited

U.S. PATENT DOCUMENTS

| 3,655,826 | 4/1972 | Fellman et al. | 260/876 R |
| 3,922,320 | 11/1975 | Love | 260/876 |
| 3,944,631 | 3/1976 | Yu et al. | 260/881 |
| 3,969,469 | 7/1976 | Love | 260/891 |
| 4,160,793 | 7/1979 | Kraft | 525/230 |
| 4,168,285 | 9/1979 | Turczyk | 525/82 |
| 4,275,178 | 6/1981 | Yusa et al. | 525/71 |

OTHER PUBLICATIONS

Kirk–Othmer Encyclopedia of Chem. Tech., Third Ed., vol. 18, p. 472.

Primary Examiner—Carman J. Seccuro

[57] ABSTRACT

Polymer blends having good mechanical properties and flame retardancy comprise: (1) an interpolymer comprising: (a) crosslinked (meth)acrylate; (b) crosslinked styrene-acrylonitrile polymeric components; (2) a glassy amorphous polymer, e.g., an acrylic resin or a polymer comprising styrene; and (3) a vinyl chloride polymer.

20 Claims, No Drawings

BLEND OF IMPACT MODIFIER, VINYL CHLORIDE POLYMER, AND GLASSY AMORPHOUS POLYMER

RELATED APPLICATION

This is a continuation-in-part of U.S. Ser. No. 382,538, filed May 27, 1982, now abandoned.

BACKGROUND OF THE INVENTION

The present invention relates to a three component polymer blend having good mechanical properties and flame retardancy for use in making molded parts.

Impact resistant, weatherable polymer compositions comprising acrylate, styrene, and acrylonitrile components are known. U.S. Pat. No. 3,944,631 to A. J. Yu et al., which discloses one of the components used in the blends of the present invention, describes an interpolymer comprising: (a) crosslinked (meth)acrylate; (b) crosslinked styrene-acrylonitrile; and (c) uncrosslinked styrene-acrylonitrile polymeric components. This material is said to have superior weather resistance as compared to ABS polymers and is only taught in U.S. Pat. No. 3,944,631 for use by itself without blending with other polymeric materials.

Blends of the polymer composition described in U.S. Pat. No. 3,944,631 with certain specific thermoplastic polymers are also described in the literature. For example, U.S. Pat. No. 4,168,285 to M. J. Turczyk describes blends of vinyl chloride polymer and the polymer composition shown in U.S. Pat. No. 3,944,631. Also, blends of acrylic polymers with this composition are described in pending U.S. Ser. No. 176,887, filed Aug. 11, 1980.

Three component blends which comprise the composition of U.S. Pat. No. 3,944,631 are described in U.S. Pat. No. 4,160,793 to P. Kraft et al. in which the other two components are vinyl chloride polymer and chlorinated vinyl chloride polymer.

SUMMARY OF THE PRESENT INVENTION

The polymer blends of the present invention comprise the interpolymer shown in U.S. Pat. No. 3,944,631 with a glassy amorphous polymer, e.g., an acrylic polymer, and a vinyl chloride polymer. Such blends have good surface hardness and flame retardancy. They have utility in making molded parts (for example, stadium seats, patio furniture, bus seats and exterior wall pieces, etc.).

DESCRIPTION OF PREFERRED EMBODIMENTS

The terminology "interpolymer comprising crosslinked (meth)acrylate, crosslinked styrene-acrylonitrile and uncrosslinked styrene-acrylonitrile components", as used herein, is meant to encompass the type of interpolymer compositions described and claimed in U.S. Pat. No. 3,944,631 to A. J. Yu et al. These interpolymer compositions are formed by a three step, sequential polymerization process, as follows:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures thereof, in an aqueous polymerization medium in the presence of an effective amount of a suitable di- or polyethylenically unsaturated crosslinking agent for such a monomer, with the $C_4$–$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such a monomer, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymerizing a monomer charge of styrene and acrylonitrile, in the absence of a crosslinking agent, in the presence of the product resulting from Step 2. If desired, Steps 1 and 2 can be reversed in the above described procedure.

This product, which is used as the predominant ingredient in the blend of the present invention, comprises from about 5% to about 50%, by weight, of at least one of the above-identified crosslinked (meth)acrylates, from about 5% to about 35%, by weight, of the crosslinked styrene-acrylonitrile component, and from about 15% to about 90%, by weight, of the uncrosslinked styrene-acrylonitrile component. It contains little graft polymerization between the styrene-acrylonitrile copolymer segments and the crosslinked (meth)acrylate polymeric component, and it has an optimum processing range of from about 199° C. to about 232.2° C. The particular optimum temperature will depend upon the precise amount of each of the three differing polymer phases which are present in the composition. Further details regarding this type of polymer composition can be found in U.S. Pat. No. 3,944,631 to A. J. Yu et al., which is incorporated herein by reference.

The terminology "vinyl chloride polymer", as used herein, is meant to encompass polyvinyl chloride homopolymers, as well as the copolymers of vinyl chloride with comonomers polymerizable therewith, with the former monomer predominating the latter in amount. Such comonomers include vinyl esters of carboxylic acids, such as vinyl acetate, the $C_1$–$C_{20}$ alkyl esters of acrylic and methacrylic acid, the aryl, halo- and nitro-substituted benzyl esters of acrylic and methacrylic acid, the ethylenically unsaturated mono- and dicarboxylic acids, and the like.

The term "glassy amorphous polymer" as used herein, is intended to encompass those resins which are non-rubber modified, non-crystalline, and have good mechanical, thermal, and hardness properties. Details regarding the structure of these polymeric materials as well as the processes for forming them are available from a number of sources. Representative polymers which are included in this class of plastics include: acrylic resins such as polymethyl methacrylate, polystyrene, and poly-α-methyl styrene. Copolymers of glassy amorphous polymers with minor amounts of one or more polymerizable monomers are also intended to be encompassed, e.g., copolymers of styrene with methyl methacrylate or acrylonitrile. Commercially available acrylic resins include those sold under the following trademarks: Lucite (E. I. duPont de Nemours and Co.); and Plexiglas (Rohm and Haas Co.). commercially available styrene-acrylonitrile polymers are available under the following marks: Tyril (Dow Chemical) and Lustran (Monsanto).

The respective weight amounts of the three above-described components of the blends of this invention can be varied within the following weight percentages (based on the weight of the entire blend): interpolymers—from about 25% to about 65%; vinyl chloride polymer—from about 20% to about 50% and glassy amorphous polymer—from about 15% to about 40%. Preferred blends generally will comprise from about 35% to about 50%, by weight, of the interpolymer, from about 30% to about 40%, by weight of the vinyl chloride polymer, and from about 20% to about 30%, by weight of the glassy amorphous polymer.

The blends of the present invention have better flame retardancy and impact resistance than blends of the interpolymer and glassy amorphous polymer and have better mechanical properties and heat distortion temperature than blends of the interpolymer and vinyl chloride polymer.

In addition to the three aforementioned components, the compositions of the present invention can contain other additives, which enhance specific desired properties of the compositions. Representative additives include heat and light stabilizers, antioxidants, fillers (e.g., calcium carbonate, clay, etc.), lubricants, additional impact modifiers, additional flame retardant and/or smoke suppressant additives (e.g., antimony oxide, aluminum trihydrate, etc.), and pigments (e.g., titanium dioxide, carbon black, etc.).

The blends of this invention can be formulated from the components thereof by any of the commonly used compounding techniques including single or twin screw extrusion, two-roll or Banbury milling, and the like. Shapes or articles can be fabricated from the compounded blends by extrusion, calendering, injection molding, or any other fabrication method which is suitable for thermoplastic resins. Mixtures of the components of the blends may also be fabricated directly into shapes or articles by any method which will suitably compound them in the course of fabrication. The present invention will be further understood by examination of the following Examples which illustrate certain embodiments of the present invention.

EXAMPLE 1

This Example illustrates the physical property profile for certain compositions including a composition in accordance with the present invention.

An interpolymer modifier composition was formed by blending, at 85° C. for 10 min. in a Welex high intensity blender, 10,000 gm. of interpolymer (32% crosslinked polybutyl acrylate, 10% crosslinked styrene-acrylonitrile, and 58% uncrosslinked styrene-acrylonitrile as described in U.S. Pat. No. 3,944,631 to A. J. Yu et al.), 10 gm. of tin carboxylate stabilizer (T-340 brand from Carstab Chemicals), and 50 gm. of polyethylene lubricant (AC-392 brand from Allied Chemical Company). This composition will be referred to as "interpolymer powder" in this Example.

Various compositions were extruded as indicated in the following Table for later testing. Composition D is in accordance with the present invention and comprises 50 wt. % interpolymer, 25 wt. % polymethyl methacrylate, 25 wt. % polyvinyl chloride.

| Composition | Amount | Extrusion Temp. (°C.) |
| --- | --- | --- |
| A: Interpolymer Powder | 9.98 kg. | 193–204 |
| B: Interpolymer Powder: | 6.81 kg. | 204–215 |

| Composition | Amount | Extrusion Temp. (°C.) |
| --- | --- | --- |
| PMMA Pellets (50:50) | | |
| C: Interpolymer Powder: PVC powder (50:50) | 10.43 kg. | 176–193 |
| D: *A 50:50 mixture of Interpolymer: PVC (50:50) (Composition C), and Interpolymer: PMMA (50:50)(Composition B) | 23.13 kg. | 193–204 |

PMMA = polymethyl methacrylate (LUCITE 147K brand).
PVC = polyvinyl chloride (GEON 103 EPF-76 brand), a suspension resin designed for exterior profiles.
The PVC powder used in Composition C comprised 100 parts by weight PVC, 2.0 parts tin mercaptide stabilizer (THERMOLITE 137 brand), 0.5 part paraffin wax (HOECHST XL 165 brand), 0.3 part polyethylene lubricant (ALLIED A 629a brand), and 1.0 calcium stearate.
*present invention The extruded samples were dried at about 80° C. for over two hours before injection molding. The Table given below sets forth the physical properties noted. The values given below are the average of tests on five specimens with the value in parenthesis being the standard deviation of the data:

| Sample | Tensile Strength (MPa) | | Elongation (%) | | Tensile Mod. of Elast. (GPa) |
| --- | --- | --- | --- | --- | --- |
| | Yield | Break | Yield | Break | |
| A | 36.04 | 25.50 | 4 | 43.6 | 1.37 |
| | (0.15) | (0.74) | (0.4) | (6.3) | (0.11) |
| B | 57.77 | 39.80 | 4.7 | 42.3 | 2.29 |
| | (0.39) | (1.23) | (0.6) | (11.8) | (0.46) |
| C | 44.14 | 32.94 | 4.4 | 71.5** | 1.82 |
| | (0.18) | (0.94) | (0.5) | (26.4) | (0.35) |
| D* | 51.59 | 36.31 | 5 | 54.3 | 1.67 |
| | (0.63) | (0.50) | (0.7) | (8.2) | (0.21) |

*present invention.
**two specimens did break at values over 100% which was beyond the capability of the instrument. The value given is the average value of the remaining three specimens.

The following additional data were also generated. The numbers after "±" give the 95% confidence limits for the data:

| SAMPLE | Flexural Modulus of Elasticity (GPa) |
| --- | --- |
| A | 1.69 ± 0.08 |
| B | 2.58 ± 0.20 |
| C | 2.26 ± 0.12 |
| D* | 2.36 ± 0.04 |

*present invention

One specimen each of Samples A–D was tested for its heat distortion temperature both before and after being annealed at 90° C. for 2 hours. The following values were obtained:

| Sample | Unannealed (°C.) | Annealed (°C.) |
| --- | --- | --- |
| A | 74 | 94 |
| B | 74 | 92 |
| C | 68 | 80 |
| D* | 72 | 89 |

*present invention

The above data indicate that for sample D the heat deflection temperature is synergistic, being more than the average of the values for samples B and C.

The following IZOD impact data was recorded on ten specimens. The abbreviation "G" under the heading "Sample" represents that the testing was done on the side of the specimen adjacent the gate of the injection molding specimen, whereas "V" represents the testing was done on the side adjacent the vent of the specimen. The pendulum capacity was 107 J/m, except for sample C where it was 267 J/m. The 95% confidence limits are given after the "±" sign. Under the heading IZOD Impact, "B" indicates brittle break, and "D" indicates ductile break.

| SAMPLE | IZOD Impact (J/m) | |
|---|---|---|
| A-G | 481 ± 32 | D |
| A-V | 166 ± 21 | D |
| B-G | 32 ± 5 | B |
| B-V | 27 ± 5 | B |
| C-G | 870 ± 27 | D |
| C-V | 785 ± 32 | D |
| D*-G | 75 ± 5 | B |
| D*-V | 85 ± 5 | B |

*present invention

This data shows that the present invention has better impact strength than a mixture of interpolymers and glassy polymer (acrylic) above.

EXAMPLE 2

This Example illustrates the admixture, as appropriate, of suitable amounts of: (1) interpolymer/PVC blends; (2) interpolymer/polymethyl-methacrylate blends; (3) interpolymer; and (4) polymethyl methacrylate to yield blends of varying amount of interpolymer, polyvinyl chloride, and polymethyl methacrylate in accordance with the present invention. The compositions and procedures employed in Example 1 were used.

The Table given below sets forth the average IZOD impact values for ten specimens of each sample.

| Sample | Interpolymer | PVC | PMMA | IZOD Impact* (J/m) |
|---|---|---|---|---|
| | (parts by weight) | | | |
| A | 50 | 25 | 25 | 80 B |
| B | 50 | 20 | 30 | 91 B |
| C | 50 | 30 | 20 | 240 D |
| D | 55 | 25 | 20 | 176 B |
| E | 55 | 20 | 25 | 139 B |
| F | 60 | 20 | 20 | 166 B |
| G | 45 | 25 | 30 | 85 B |
| H | 45 | 30 | 25 | 192 B |
| I | 45 | 35 | 20 | 336 D |

*determined on 3.18 mm. thick plaques. "B" indicates brittle break; "D", ductile break.

The data illustrate that for the best IZOD values the composition should contain less than about 25 parts by weight PMMA (acrylic resin), and the composition should contain over 25 parts by weight PVC.

EXAMPLE 3

This Example further illustrates the present invention.

A series of blends were made by blending the components tested below and compounding them at about 200° C. until homogeneous.

| Blend | Description of Components |
|---|---|
| A | 35% interpolymer modifier<br>35% PVC<br>30% PMMA (1) |
| B | 35% interpolymer modifier<br>35% PVC<br>30% PMMA (1)<br>10% $CaCO_2$ (2) |
| C | 35% interpolymer modifier<br>45% PVC<br>30% SAN (3) |
| D | 35% interpolymer modifier<br>35% PVC<br>30% SAN (3)<br>10% $CaCO_3$ (2) |
| E | 50% interpolymer modifier<br>50% PVC |
| F | 35% interpolymer modifier<br>35% PVC<br>30% PMMA (4) |

(1) CP-61 brand from Continental Polymers.
(2) SUPERFLEX 200 precipitated calcium carbonate from Pfizer Inc.
(3) styrene acrylonitrile resin: SAN-1000 brand from Dow Chemical Co.
(4) LUCITE 147K brand from DuPont The blends were injection molded at 210° C. barrel temperature and test specimens were tested for various properties. Sheet measuring 8.50 cm width by 0.10 cm. thickness was extruded for Dart impact measurement.

The following physical test data was obtained on each of the blends:

| Blend | Coeff. of Linear Thermal Expans. (20 to 60° C.) (m/m/°C. × $10^{-5}$) | Izod Impact (J/m) ASTM/D-256 | Dart Drop Impact* (J/m) | Ten. Str. at Yield (MPa) ASTM/D-638 | Elong. at Break (%) ASTM/D-638 | Tens. Modulus (GPa × $10^{-5}$) ASTM/D-638 | Flex. Modulus (GPa × $10^{-5}$) ASTM/D-790 | Heat Deflection Temp. (°C.) ASTM/D-648 | |
|---|---|---|---|---|---|---|---|---|---|
| | | | | | | | | Unannealed | Annealed** |
| A | 8.6 | 123 | 6500 | 51.9 | 23 | 2.12 | 2.44 | 72 | 80 |
| B | 8.4 | 112 | 4140 | 48.8 | 24 | 2.28 | 2.63 | 71 | 80 |
| C | 8.6 | 101 | 8810 | 60.0 | 15 | 2.20 | 2.53 | 76 | 82 |
| D | — | 96 | 4183 | 47.0 | 22 | 2.44 | 2.69 | 76 | 83 |
| E | 9.9 | 876 | 11440 | 43.3 | 32 | 1.79 | 2.12 | 70 | 78 |
| F | — | 128 | 5780 | 51.3 | 32 | 2.11 | 2.57 | 72 | 79 |

*extruded sheet specimen (0.10 cm. thick) impacted from variable height by 0.91 Kg dart with 1.27 cm diameter tip over 1.59 cm. diameter support ring.
**at 80° C. for 2 hours.

The above data illustrate that the polymer blend of the present invention possesses good impact properties and has heat resistance and mechanical properties superior to a blend of interpolymer and PVC. The data also illustrates that various different glassy amorphous polymers can be used to achieve these results.

The preceding Examples illustrate certain embodiments of the present invention and should not be construed in a limiting manner. The scope of protection that is sought is set forth in the claims which follow.

What is claimed:

1. A flame retardant blend having good impact resistance and a high heat deflection temperature comprising:
   (1) a three stage interpolymer comprising: (a) crosslinked (meth)acrylate; (b) crosslinked styrene-acrylonitrile; and (c), as the third stage, uncrosslinked styrene-acrylonitrile components;
   (2) a glassy amorphous polymer which is an acrylic resin or a polymer comprising styrene; and
   (3) a vinyl chloride polymer.

2. A blend as claimed in claim 1 wherein the interpolymer comprises from about 5% to about 50%, by weight of said crosslinked (meth)acrylate component, from about 5% to about 35% by weight of said crosslinked styrene-acrylonitrile component, and from about 15% to about 90% by weight of said uncrosslinked styrene acrylonitrile component.

3. A blend as claimed in claim 1 which comprises from about 25% to about 65%, by weight, of the interpolymer, from about 20% to about 50%, by weight of the vinyl chloride polymer, and from about 15% to about 40% by weight of the glassy amorphous polymer.

4. A blend as claimed in claim 1 which comprises from about 35% to about 50%, by weight, of the interpolymer, from about 30% to about 40%, by weight of the vinyl chloride polymer, and from about 20% to about 30% by weight of the glassy amorphous polymer which is an acrylic resin.

5. A blend as claimed in claim 2 which comprises from about 25% to about 65%, by weight, of the interpolymer, from about 20% to about 50%, by weight of the vinyl chloride polymer, and from about 15% to about 40% by weight of the glassy amorphous polymer.

6. A blend as claimed in claim 2 which comprises from about 35% to about 50%, by weight, of the interpolymer, from about 30% to about 40%, by weight of the vinyl chloride polymer, and from about 20% to about 30% by weight of the glassy amorphous polymer which is an acrylic resin.

7. A blend as claimed in claim 1 which contains no more than about 30 parts by weight glassy amorphous polymer and over 30 parts by weight vinyl chloride polymer per 100 parts by weight of the blend.

8. A blend as claimed in claim 2 which contains no more than about 30 parts by weight glassy amorphous polymer and over 30 parts by weight vinyl chloride polymer per 100 parts by weight of the blend.

9. A blend as claimed in claim 4 in which the acrylic resin is polymethyl methacrylate.

10. A blend as claimed in claim 6 in which the acrylic resin is polymethyl methacrylate.

11. A blend as claimed in claim 1 which contains less than about 30 parts by weight polymethyl methacrylate and over 30 parts by weight vinyl chloride polymer per 100 parts by weight of the blend.

12. A blend as claimed in claim 2 which contains less than about 30 parts by weight polymethyl methacrylate and over 30 parts by weight vinyl chloride polymer per 100 parts by weight of the blend.

13. A blend as claimed in claim 1 wherein the glassy amorphous polymer comprises styrene.

14. A blend as claimed in claim 2 wherein the glassy amorphous polymer comprises styrene.

15. A blend as claimed in claim 5 wherein the glassy amorphous polymer comprises styrene.

16. A blend as claimed in claim 7 wherein the glassy amorphous polymer comprises styrene.

17. A blend as claimed in claim 8 wherein the glassy amorphous polymer comprises styrene.

18. A blend as claimed in claim 1 wherein the glassy amorphous polymer is styrene-acrylonitrile polymer.

19. A blend as claimed in claim 2 wherein the glassy amorphous polymer is styrene-acrylonitrile polymer.

20. A blend as claimed in claim 7 wherein the glassy amorphous polymer is styrene-acrylonitrile polymer.

* * * * *